(12) United States Patent
Espinasse et al.

(10) Patent No.: US 7,311,123 B2
(45) Date of Patent: Dec. 25, 2007

(54) FLEXIBLE TUBULAR PIPE

(75) Inventors: Philippe Espinasse, Bihorel (FR); Patrice Joël Louis Jung, La Mailleraye sur Seine (FR); Daniel Averbuch, Rueil-Malmaison (FR); François Dupoiron, Barentin (FR)

(73) Assignees: Coflexip (FR); Institut Francais du Petrole (FR)

( * ) Notice: Subject to any disclaimer, the term of this patent is extended or adjusted under 35 U.S.C. 154(b) by 661 days.

(21) Appl. No.: 10/432,755

(22) PCT Filed: Nov. 12, 2001

(86) PCT No.: PCT/FR01/03525

§ 371 (c)(1), (2), (4) Date: Jul. 1, 2003

(87) PCT Pub. No.: WO02/42673

PCT Pub. Date: May 30, 2002

(65) Prior Publication Data

US 2004/0055657 A1    Mar. 25, 2004

(30) Foreign Application Priority Data

Nov. 24, 2000  (FR)  .................. 00 15203
Jan. 25, 2001  (FR)  .................. 01 01010

(51) Int. Cl.
*F16L 11/16*    (2006.01)

(52) U.S. Cl. .................. 138/135; 138/134; 138/136; 138/138; 138/129

(58) Field of Classification Search .............. 138/134, 138/135, 136, 129, 150
See application file for complete search history.

(56) References Cited

U.S. PATENT DOCUMENTS

| | | | | |
|---|---|---|---|---|
| 916,890 A * | 3/1909 | Rubes | ................. | 138/131 |
| 2,022,694 A * | 12/1935 | Stone | ................. | 138/131 |
| 2,402,497 A * | 6/1946 | Johnson | ................. | 138/135 |
| 3,311,133 A * | 3/1967 | Kinander | ................. | 138/136 |
| 4,368,088 A | 1/1983 | Asakura et al. | ................. | 156/143 |
| 4,862,924 A * | 9/1989 | Kanao | ................. | 138/144 |
| 5,669,420 A * | 9/1997 | Herrero et al. | ................. | 138/135 |
| 6,668,867 B2 * | 12/2003 | Espinasse et al. | ................. | 138/135 |
| 6,840,286 B2 * | 1/2005 | Espinasse et al. | ................. | 138/135 |
| 6,904,939 B2 * | 6/2005 | Jung et al. | ................. | 138/135 |

FOREIGN PATENT DOCUMENTS

| | | |
|---|---|---|
| FR | 2654795 | 5/1991 |
| FR | 2665237 | 1/1992 |
| FR | 2782142 | 2/2000 |
| FR | 2784445 | 4/2000 |
| FR | 2808070 | 10/2001 |
| GB | 1081339 | 8/1967 |

* cited by examiner

*Primary Examiner*—Patrick F. Brinson
(74) *Attorney, Agent, or Firm*—Ostrolenk, Faber, Gerb & Soffen, LLP

(57) ABSTRACT

A flexible tubular pipe comprising a metal carcass helically coiled about a longitudinal axis of said flexible pipe and the carcass comprises a seamed profiled hollow tube.

15 Claims, 12 Drawing Sheets

FLEXIBLE TUBULAR PIPE

BACKGROUND OF THE INVENTION

The present invention relates to a flexible tubular pipe which can be preferably used in deep-sea applications, for depths of between 1000 and 3000 m, although it can also be used for depths of less than 1000 m. Such flexible tubular pipes are used in subsea oil production installations for transporting fluids such as hydrocarbons.

The present invention relates to a flexible tubular pipe which can be preferably used in deep-sea applications, for depths of between 1000 and 3000 m, although it can also be used for depths of less than 1000 m. Such flexible tubular pipes are used in subsea oil production installations for transporting fluids such as hydrocarbons.

Several types of flexible tubular pipes are used at the present time and are described in API (American Petroleum Institute) 17 J. In certain flexible pipes, there is a pressure vault which consists of a helical winding with a short pitch of a shaped wire which may be self-interlockable or interlockable by means of a fastener. Likewise, the metal carcasses used in flexible pipes called "rough bores" are formed from a crush-resistant doubly interlocking profiled metal strip.

In all cases, it has been attempted to improve the moment of inertia/weight ratio of the interlocked strips or shaped wires used for producing the various metal layers of the flexible pipes.

For deep-sea applications and in the case of pressure vaults, the reinforcing wires must have a high moment of inertia in order to withstand the external pressure and a low weight in order to reduce the total weight of the flexible pipe so as to improve the performance of the pipelaying means and allow the flexible pipe to be self-supporting.

Several solutions have been proposed.

A first solution has consisted in using a shaped wire, the cross-section of which is in the form of an I, as described in FR-A-2 782 142. Such a shaped wire has an acceptable moment of inertia/weight ratio but the manufacturing cost is very high because of the fact that it is obtained by rolling or wire drawing.

Another solution is described in FR 2 654 795. The internal carcass is formed from doubly interlocking metal strips, by making a flat metal tape, such as a stainless steel strip, undergo plastic deformation in order to give it the shape of a doubly interlocking profiled strip, and then by spiraling the profiled strip, that is to say winding it helically with a short pitch with interlocking of the profiled metal strips. After two consecutive turns have been interlocked, a final plastic deformation of the strip is carried out in order to complete the interlocking.

In Patent FR 2 665 237 it is recommended to produce a tubular metal carcass comprising at least one box section wound in a helix with a short pitch, said metal carcass being obtained by means of two complementary profiled strips wound helically with a short pitch. Many examples of profiled strips are described and shown in that document, some of which, such as for example those in FIGS. 8 and 9, consisting of a strip in the form of an elongated S and having a box section at a first end and an upwardly curved fastening edge at the other end, the fastening edge penetrating a dish formed by the box section and the transverse bar of the of the preceding turn. The curved fastening edge may rest on the bottom of the dish (FIG. 9) or it may not be in contact with said bottom (FIG. 8).

It should be noted that all the cross-sections of the box sections provided at one or both ends of each profiled strip are square or rectangular cross-sections.

Although such box-section profiled strips have been satisfactory, they have been found to have certain drawbacks. When one considers that a box section is formed by parts of the same turn of the profiled strip and comprises an upper wall, a lower wall and side walls and when an external force is applied to one of the upper and/or lower walls, such as a compressive or crushing force or else a force generated by the underpressure fluid, buckling of the side walls or faces and/or the upper or lower walls of the box section may then occur, thereby reducing, at least locally, the crush resistance of the internal carcass.

For forces or pressures exceeding a certain value, buckling of the side walls of the box section occurs.

For lower forces or pressures and when the side walls are not strictly perpendicular to the upper and lower walls of the box section, crushing of said box section may occur, resulting in the side walls moving further apart or closer together (opening or closing of the box section). To prevent this opening or closing phenomenon, it has been recommended in certain cases such as, for example, in FR 2 665 237 to weld one end of the box section at one point on the strip. However, such a solution increases the manufacturing cost and it is difficult to implement.

In a prior embodiment, the box-section strip adopts the shape of a pair of spectacles. This profile is produced from a strip whose free edges are welded to this same profile so as to give the profile good stability for laying. However, the welding operation is difficult to implement and considerably increases the manufacturing cost.

In another prior embodiment, the spectacles-shaped profile is similar but produced from two tubes, of square cross-section, said tubes being joined together by a strip which is welded to these tubes. The welding operations again considerably increase the manufacturing cost.

In addition, these various shapes of the profile do not make it possible to limit the creep of an adjacent sealing sheath. It is sought to prevent such creep as far as possible, mainly in the case of the pressure vault. It should also be noted that no information is provided regarding the width/thickness ratio of the strip, although this has become important in order to ensure stability of the profile during pipe laying, so as to prevent the buckling effect.

This is because if the profile has too large a width with respect to its thickness, the side walls of the box section will buckle during spiraling or winding with a short pitch.

In French Patent No. 2 808 070, the profiles that are described give good results but sometimes have drawbacks, especially because of the great lack of symmetry of the profile.

SUMMARY OF THE INVENTION

The object of the present invention is to provide a profile which makes it possible to simplify the spiraling operations while still having a high moment of inertia/pitch ratio, similar to that obtained with conventional shaped wires of equivalent height, and a high moment of inertia/weight ratio which is needed in particular for great depths.

The subject of the present invention is a flexible tubular pipe comprising a metal box section spiraled in a helix about a longitudinal axis of said flexible pipe and it is characterized in that the box section consists of at least one interlocked hollow profiled tube.

The invention can be carried out in order to produce a pressure vault or a carcass with an interlocked tube of any cross-section.

One advantage of the present invention lies in the fact that an inexpensive tube is used which is profiled, for example, using a roll train or a die to the desired shape. In this way it is possible to optimize the moment of inertia of the profile, and therefore to improve the moment of inertia/weight ratio, and-to give it a shape suitable for the interlocking of the winding turns to be carried out simply and without any difficulty.

Another advantage of the present invention is that it is no longer necessary to provide a system for holding the box section, which in the prior art is produced by stopping or welding it, which simplifies the manufacture, for example, of the pressure vault produced using the tube according to the invention, so that the manufacturing cost is considerably reduced.

Another advantage is that the moment of inertia/winding pitch ratio is optimized, it being possible for the interlocked profile tube to limit the influence of the necessary gap between the turns in order to give the pipe a certain flexibility.

Another advantage lies in the fact that the hollow profiled tube is approximately symmetrical and in that the compression regions compensate for the tension regions. In this way, the winding or spiraling is easier to implement.

Further advantages and features will become apparent on reading the description of several embodiments of the invention and the appended drawings in which.

DESCRIPTION OF THE PREFERRED EMBODIMENTS

The term "interlocked" is understood hereafter to mean either a profile that is not interlockable, but which would be interlocked by one or more fasteners, or an interlockable profile or a self-interlockable profile.

In the embodiments shown in FIGS. 1 to 5, the hollow profiled tubes are not interlockable and therefore require one or two fasteners of suitable cross-section in order to link two consecutive turns of the same winding together when a single hollow profiled tube is used or of two windings when two hollow profiled tubes are used. Such non-interlockable profile tubes may be compared with hoop reinforcements well known to experts and described in API 17 J.

Figure 1:
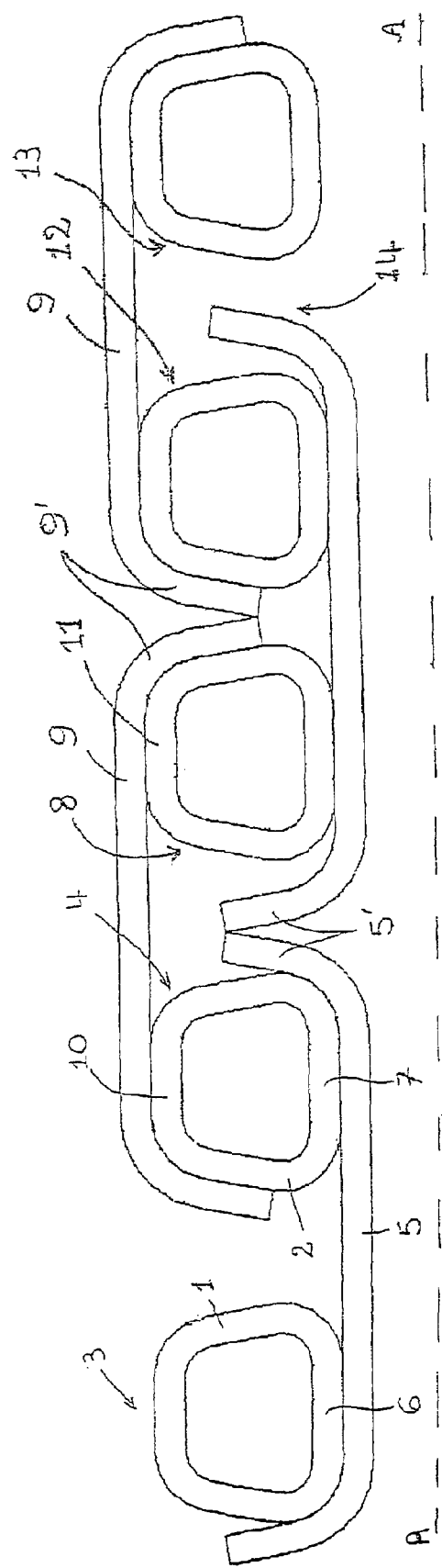
FIG. 1 is a schematic sectional view of a pressure vault produced by the helical winding of at least one hollow profiled tube according to a first embodiment of the invention.

The hollow profiled tubes 1 and 2 may each have a trapezoidal cross-section, as shown in FIG. 1, the trapezoidal cross-section being obtained, for example, from a tube of circular cross-section which has been deformed by a roll train or in a die. Each tube is helically wound about the longitudinal axis A-A of the flexible pipe, which has not been shown but which is described according to the various types in the API 17 J. To produce a pressure vault, the two tubes 1 and 2 are wound or spiraled with a short pitch. The two tubes 1 and 2 of the two consecutive turns 3 and 4 are joined together or fastened by means of a first fastener 5 which goes around the lower faces 6 and 7 of the tubes 1 and 2. The fastener 5 has an approximately U shape. The consecutive turns 4 and 8 are interlocked by means of a fastener 9, similar to the fastener 5, but going around the upper faces 10 and 11 of the tubes constituting the next turns. The turn 12 is interlocked with the previous turn 8 by a lower fastener 5, whereas the turn 12 and the next turn 13 are interlocked using an upper fastener 9.

Preferably, the lower fasteners 5 and the upper fasteners 9 have arms 5' and 9' which are inserted sufficiently into the interstices or gaps 14 between the turns, so that good interlocking is achieved.

Figure 2:
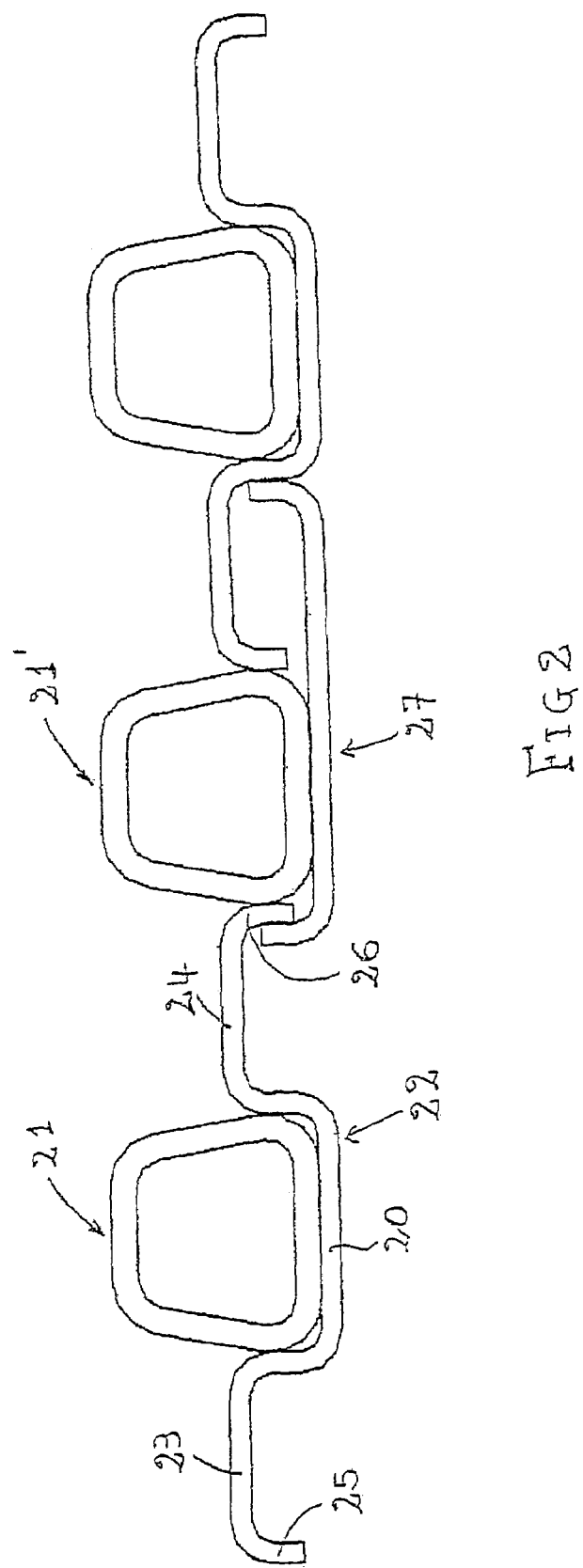
FIG. 2 is a schematic sectional view of a pressure vault produced by the helical winding of at least one hollow profiled tube according to a second embodiment of the invention.

In the embodiment shown in FIG. 2, the hollow profiled tubes 21 and 21' are similar to those represented in FIG. 1, but the fastener between two consecutive turns is obtained by means of different fasteners.

Each hollow profiled tube 21, 21' is housed in contact in a horizontal part 20 of a fastener 22, which has two lateral flanges or horizontal parts 23, 24 located at an upper level with respect to the lower level occupied by the part 20. The flanges 23, 24 have ends 25, 26 bent over downward in order to allow interlocking with another U-shaped fastener 27. The turn 21' bears on the fastener 27 and is held in place by the contact on the ends 26 and 25 of the fastener 22, which may be regarded as adopting the shape of a double S.

Figure 3:
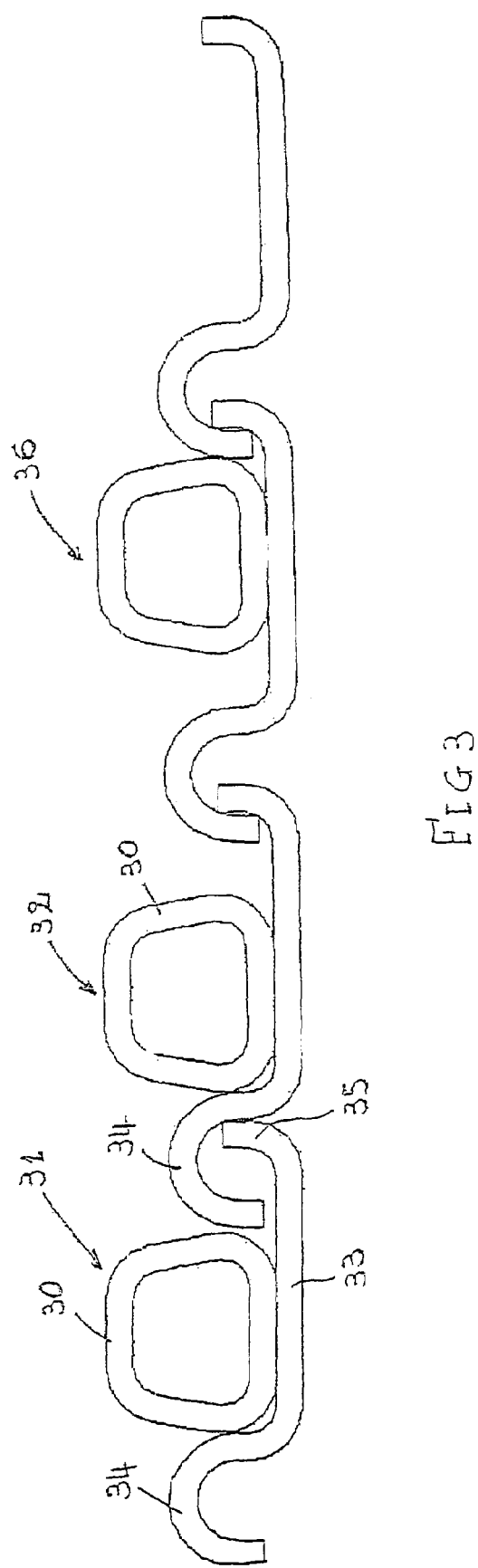
FIG. 3 is a schematic sectional view of a pressure vault produced by the helical winding of at least one hollow profiled tube according to a third embodiment of the invention.

In the embodiment shown in FIG. 3, the hollow profiled tubes 30 have a trapezoidal cross-section and two consecutive turns 31 and 32 are interlocked by means of fasteners 33, each having an end 34 which is raised and then bent over downward, and the other end 35 is simply raised upward, so that two fasteners 33 interlock via their ends. In the left-hand part of FIG. 3, the hollow profiled tube 30 nearly bears on the two ends 34 of two consecutive fasteners, whereas the tube 30 of the turn 32 bears on the end 34, but is away from the end 34 of the other fastener. The pressure vault must have a certain gap between the turns in order to give the pipe a certain flexibility, FIG. 3 showing the vault with a minimum pitch (left-hand part) and with a maximum pitch (right-hand part) with the turns 32 and 36 further away.

Figure 4:
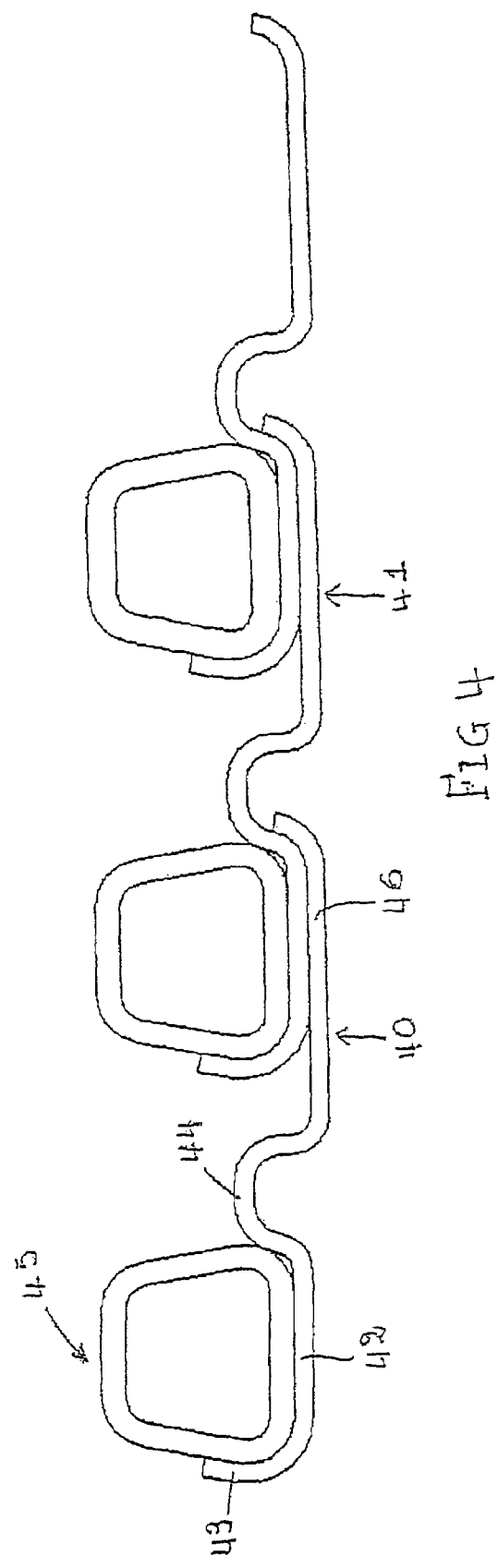
FIG. 4 is a schematic sectional view of a pressure vault produced by the helical winding of at least one hollow profiled tube according to a fourth embodiment of the invention.

In the embodiment shown in FIG. 4, the fasteners 40 and 41 are identical and each fastener 40, 41 has an elevated part 42 made between an upwardly curved end 43 and a bulge 44 of upwardly turned concavity, the turn 45 being placed on the part 42 and bearing on the end 43 and the bulge 44. The low part 46 of the fastener 40 accommodates the elevated part and the associated turn of the other consecutive fastener 41, as shown in the figure.

Figure 5:
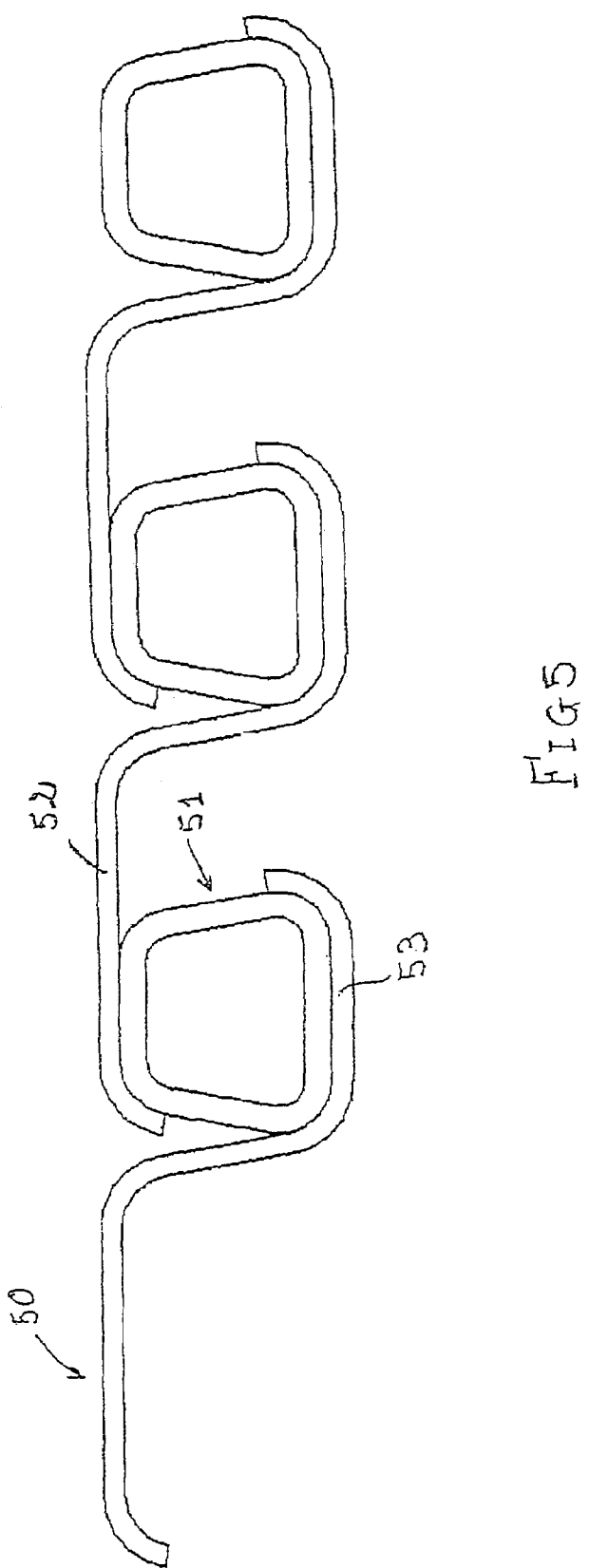
FIG. 5 is a schematic sectional view of a pressure vault produced by the helical winding of at least one hollow profiled tube according to a fifth embodiment of the invention.

In the embodiment shown in FIG. 5, the fasteners 50 adopt the shape of a zeta, each turn 51 being placed between the upper arms 52 and lower arms 53 of the consecutive fasteners.

In the embodiments shown in FIGS. 6 to 11, the hollow profiled tubes are interlockable or self-interlockable and may be compared with the interlockable shaped wires well known to experts, such as U-, Z- or T-shaped wires.

Figure 6:
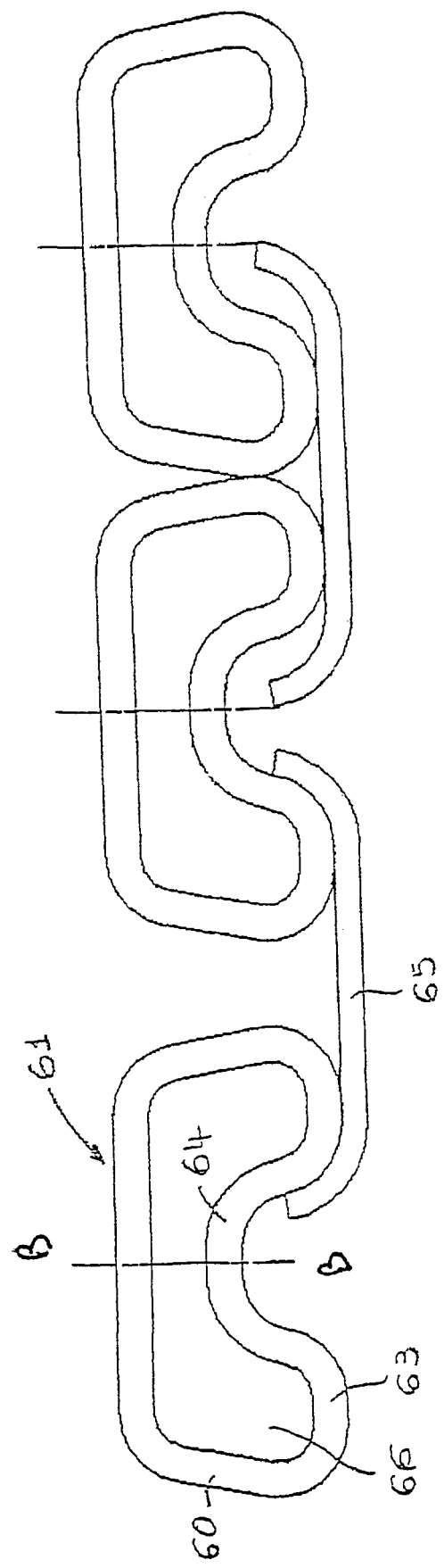
FIG. 6 is a schematic sectional view of a pressure vault produced by the helical winding of at least one hollow profiled tube according to a sixth embodiment of the invention.

In the embodiment shown in FIG. 6, each hollow profiled tube 60 of a turn 61 is also trapezoidal in shape, but with a flat horizontal upper face 62 and a lower face 63 which is deformed toward the upper wall so as to create, on the one hand, a kind of bulge 64 for the interlocking by means of an approximately U-shaped fastener 65, and, on the other hand, to define two hollow regions 66 and 67.

Figure 7:
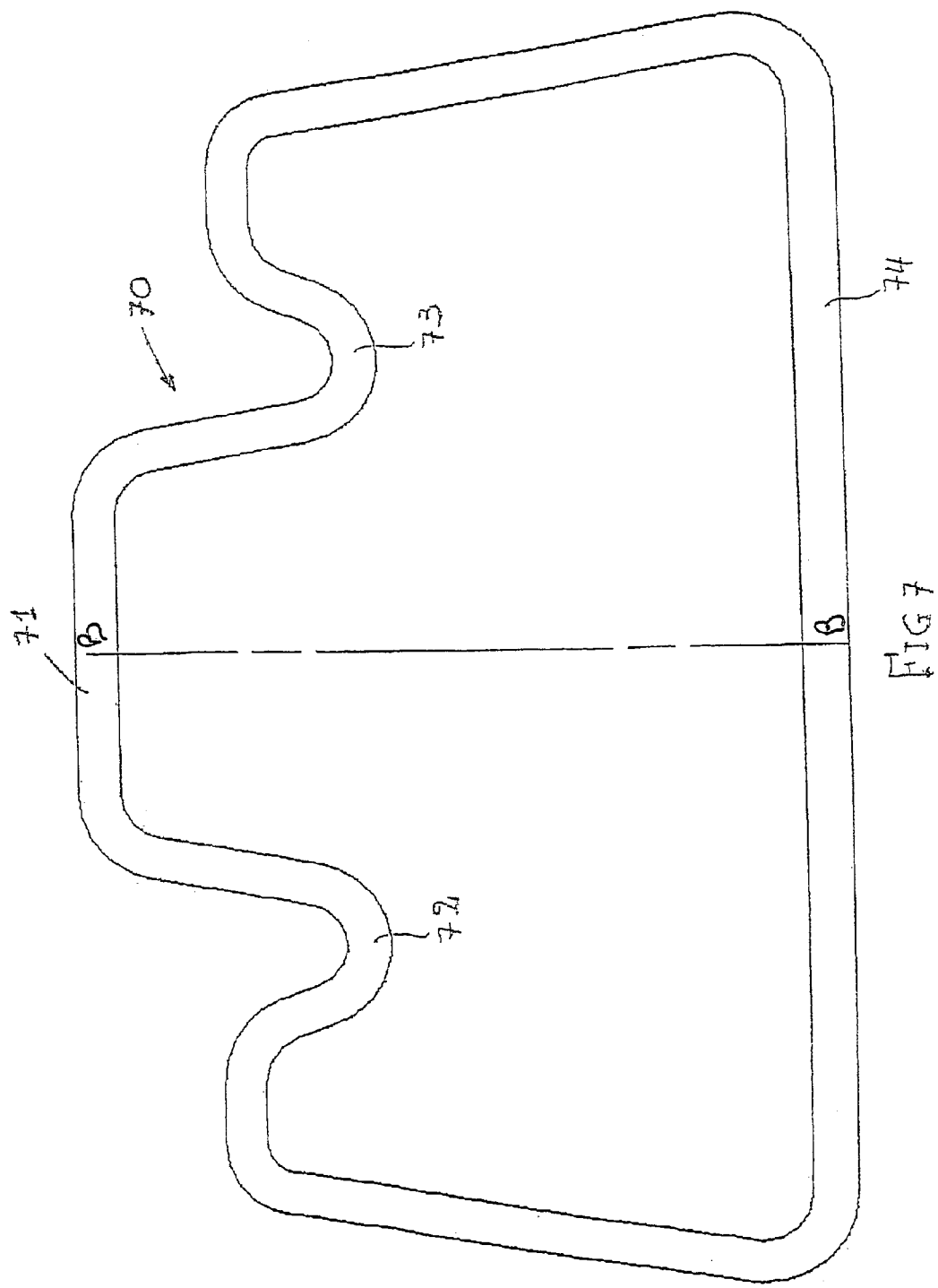
FIGS. 7, 8, 9 and 11 are schematic sectional views of a hollow profiled tube according to different embodiments of the invention.

In the embodiment shown in FIG. 7, the shape of the approximately T-shaped hollow profile 70 has an upper wall 71 which is deformed at two points in order to produce two bulges 72 and 73, the lower wall 74 being horizontal.

Figure 8:
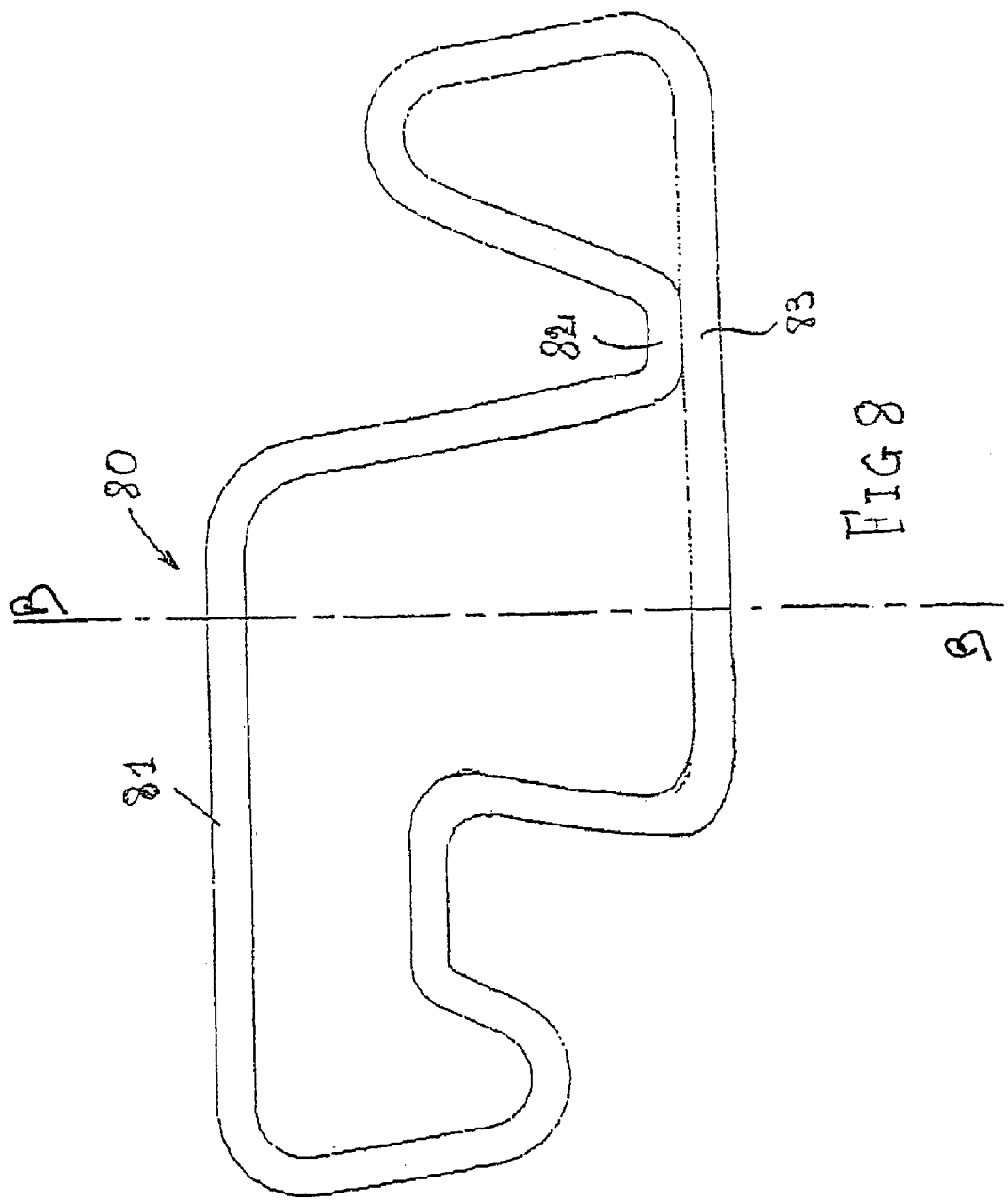

In the embodiment shown in FIG. 8, the cross-section of the hollow profiled tube 80 is a zeta, and therefore is self-interlockable with another profile tube of the same cross-section. The right-hand part differs from the left-hand part by the fact that the upper wall 81 has a deep bulge 82 which is in contact with the lower wall 83.

Figure 9:
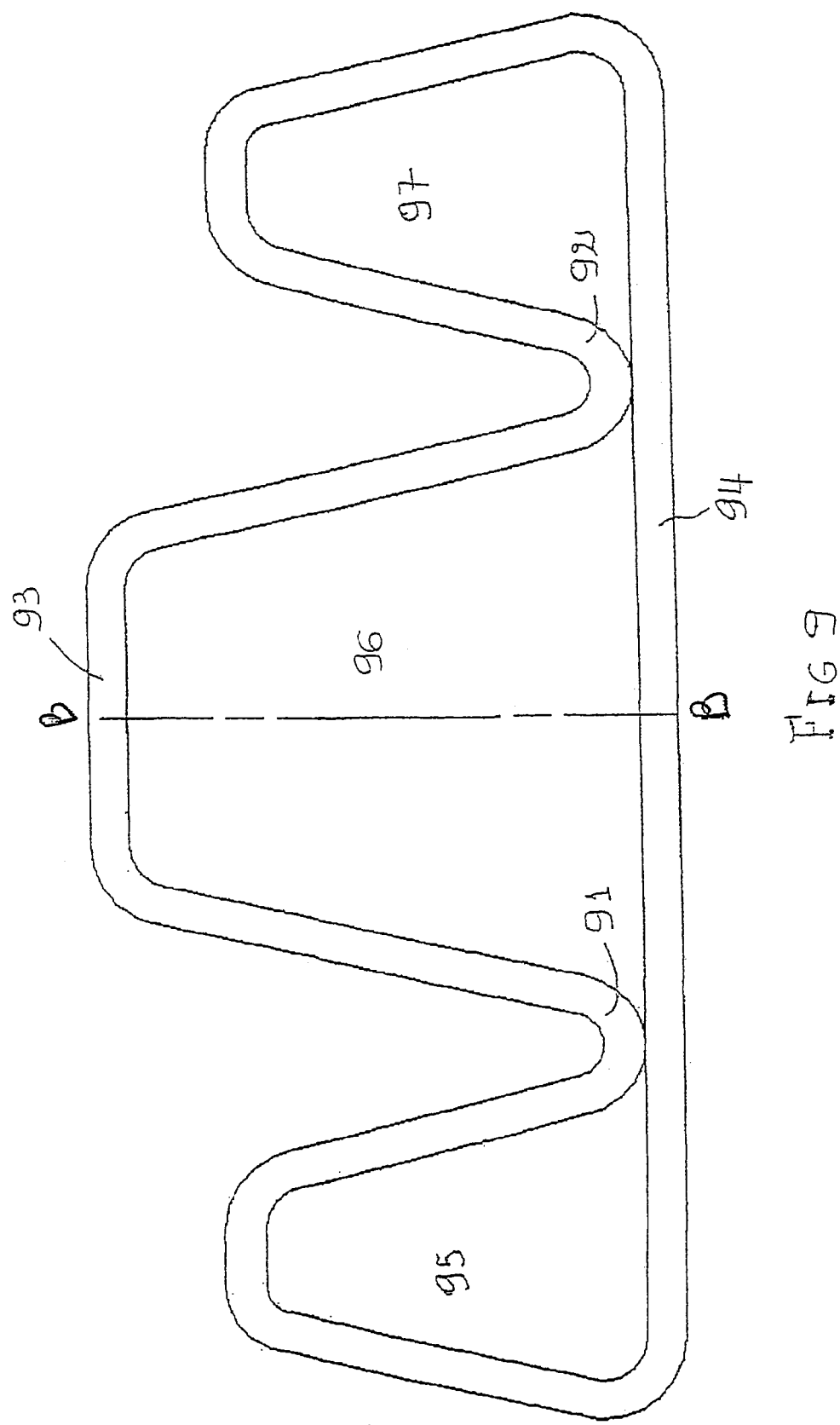

In the embodiment shown in FIG. 9, the bulges 91 and 92 of the upper wall 93 are deep and in contact with the lower wall 94 so as to stiffen the profile. In this way, three separate box sections 95 to 97 are defined, in order to improve the crush strength. This is also applicable to the embodiment shown in FIGS. 6 and 8 in which the bulge or bulges may be deep and brought into contact with the opposed wall.

Figure 10:
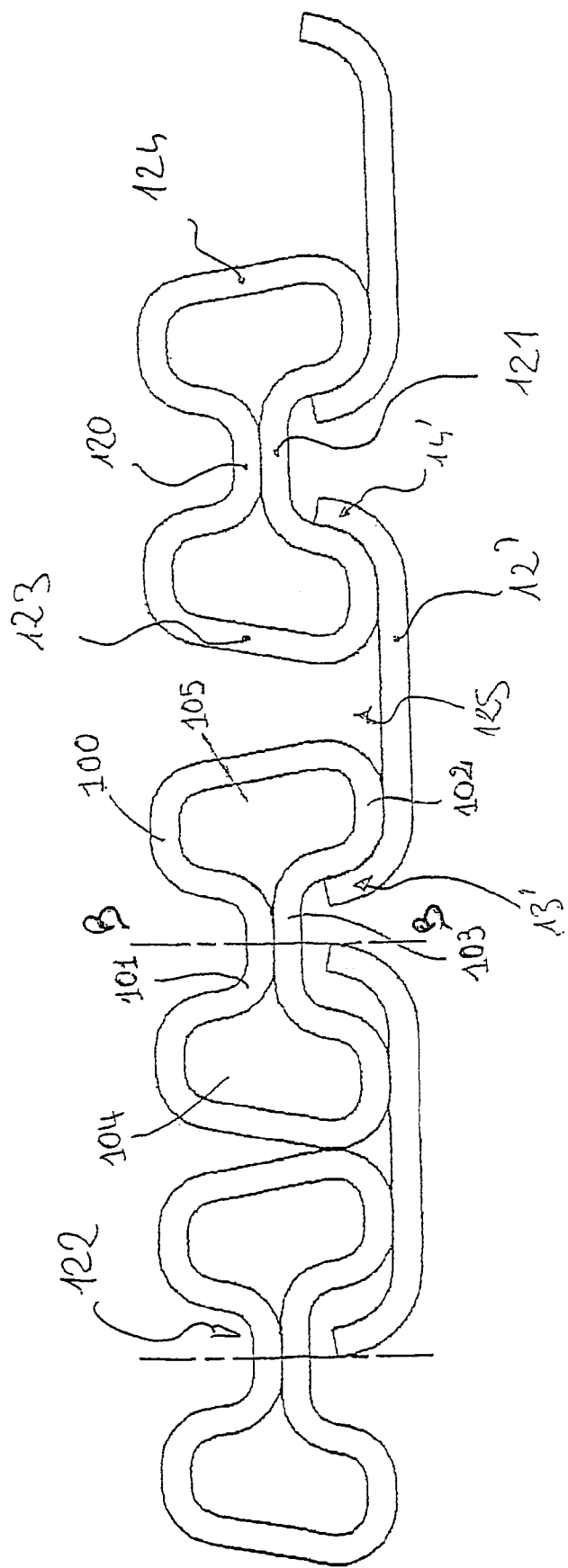
FIGS. 10 and 12 are schematic sectional views of a pressure vault produced by the helical winding of at least one hollow profiled tube according to another embodiment.

The embodiment shown in FIG. 10 differs from that shown in FIG. 6 by the fact that the upper face 100 is also deformed in order to constitute a bulge 101 directed toward and in contact with the bulge 103 on the lower face 102. In this way, a "butterfly" shape is produced, comprising two box sections 104 and 105 separated from each other. This "butterfly"-shaped profile has the advantage of providing two smaller volumes and of consequently increasing the resistance to the external pressure. In addition, since the upper wall of each box section 104, 105 is shorter, the risk of buckling is reduced.

Figure 12:
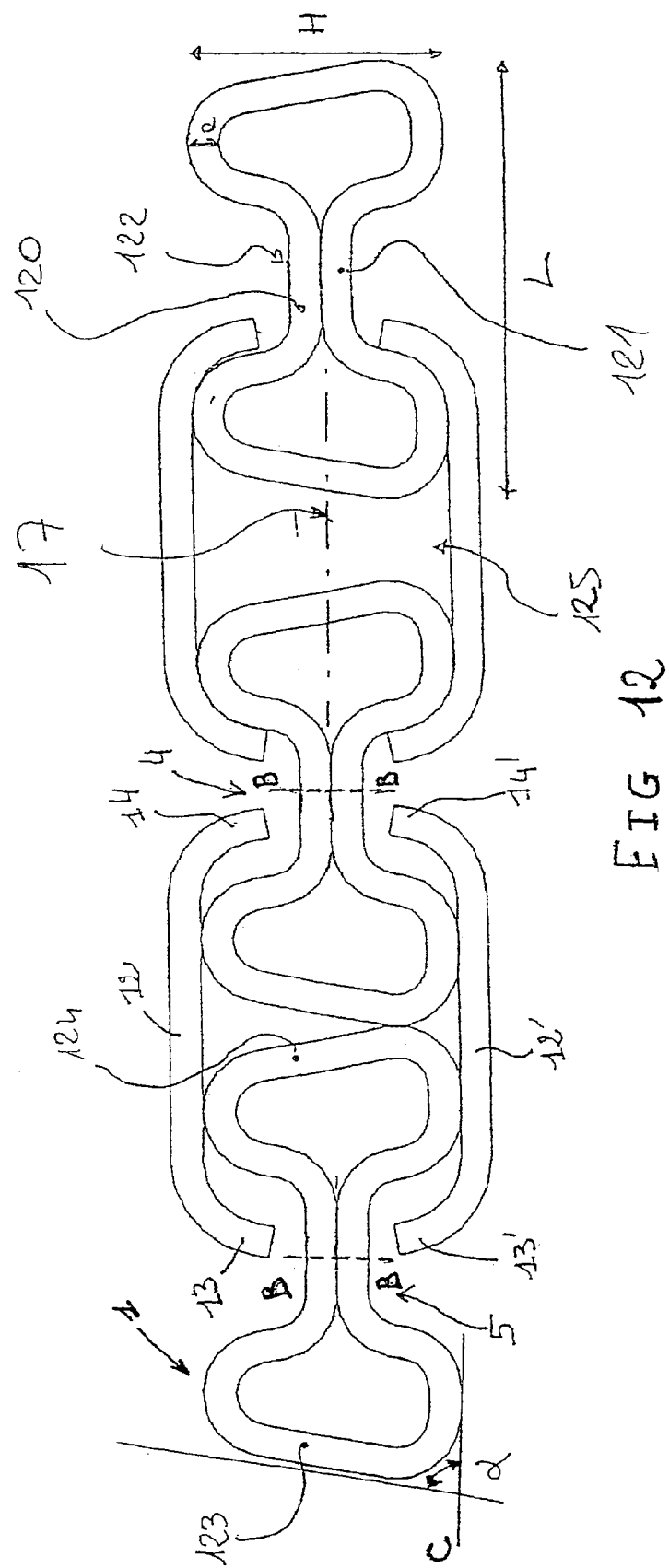

The profile according to the invention shown in FIGS. 10 and 12 consists of a metal tube 1 which is bent so as to form the separate box sections 104, 105 which are symmetrical with respect to a vertical axis of symmetry B-B. The box sections 104, 105 are separated by an upper bulge 120 and a lower bulge 121. The tube portion which constitutes the bottom of the lower bulge 121 lies approximately in the plane of the neutral fiber 17 and the upper bulge 120 bears on said tube portion, said portion forming a contact region 122 for the upper and lower walls of the tube after deformation.

Each box section, which preferably has a trapezoidal cross-section, has side walls 123, 124 which are inclined and make an angle α greater than 60° and less than 90° with the horizontal C, which corresponds to a generatrix of the flexible pipe. Since the upper bulge 120 and lower bulge 121 are on the contact region 122, which lies approximately on the plane of the neutral fiber 17 and therefore in an approximately central region of the profile, said region will therefore be subjected to few stresses during spiraling and will not work very much. This greatly improves the stability and the performance of the profile.

For an angle α close to 90°, the profile is stronger and for an angle α close to 60° the profile is more stable. Consequently, the optimum angle α is a compromise between strength and stability.

The profile described above can be used for producing a pressure vault or the metal carcass, when the flexible pipe has one, by winding it in a helix, with a short pitch, about the horizontal axis A-A of the flexible pipe, each turn of the winding consisting of a pair of box sections. Since the profile is not self-interlockable, it is possible to interlock the turns in several ways.

The first way of interlocking is shown in FIG. 10. In this embodiment, the turns of the winding of the profile are interlocked from below, that is to say the fasteners 12', for example in the form of an inverted U, have their arms 13' and 14' placed in the consecutive lower bulges. Another interlocking is shown in FIG. 12 and it consists in using the same fasteners, but referenced 12, which have their arms 13 and 14 placed in the consecutive upper bulges. In the latter case, interlocking is obtained from above, as opposed to the previous way which is called interlocking from below.

Another method of interlocking, also shown in FIG. 12, consists in interlocking the turns from above and from below, with upper fasteners 12 whose arms 13 and 14 are placed in the upper bulges and lower fasteners 12' whose arms 13' and 14' are placed in the lower bulges.

The upper and/or lower fasteners may advantageously have, in the gap 125 between two consecutive turns, a bulge or hump, not shown, which makes it possible to increase the local moment of inertia of the fastener. The fastener, stiffened at the hump, is more resistant to the internal pressure of the fluid flowing in the flexible pipe. Creep of the inner sealing sheath, owing to the effect of the internal pressure, applies a high contact pressure on the fastener. Moreover, to improve the technical characteristics of the fastener, the radii of curvature of the hump correspond to those of the profile so as to allow the functional clearances of the vault to be maintained. To increase the burst strength of the pressure vault owing to the effect of the internal pressure flowing in the flexible pipe, it is possible to use the properties of the fastener. Since the resistance to the internal pressure depends in part on the cross-section and on the mechanical properties of the material used, all that is required is to increase the thickness of the fastener or to choose a material having high mechanical properties, preferably properties superior to those of the profile; the vault-fastener pair will have a higher burst strength.

It is also possible to use means for reducing the creep of an impermeable inner polymeric sheath which bears on the profile. These means may comprise, by themselves or in combination, a rod, which may be placed in the lower bulges, and/or a shaped wire, which covers the gap between two consecutive turns. The shaped wire may be flat or have the shape of an inverted T, the vertical arm of the T fitting into the gap. The shaped wire may also be an anticreep woven strip like that described in FR 2 744 511. These means for reducing the creep of a sheath may be provided above the profile when it is interlocked from below and when a polymeric sheath is placed above the profile. It should be noted that the rod may also be placed in the upper bulges.

Another advantage lies in the fact that since the interlocking is carried out in the box section, the moment of inertia/pitch ratio of the profile is thus optimized while eliminating the regions of low moment of inertia.

Figure 11:
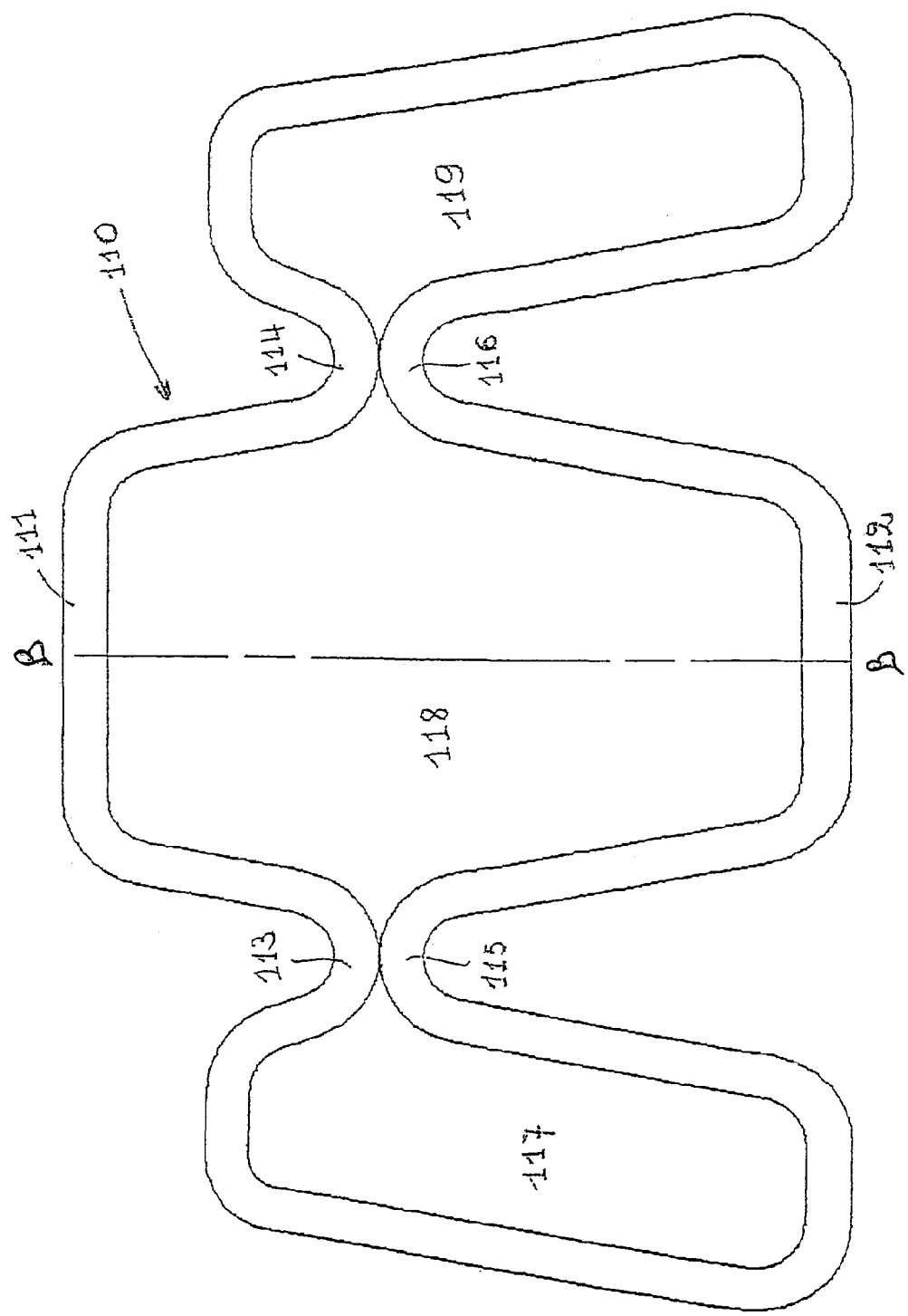

The embodiment shown in FIG. 11 relates to the special shape of a hollow profiled tube 110 whose upper wall 111 and lower wall 112 are deformed at two points with bulges 113, 114 and 115, 116, respectively, the bulges 113 and 115 being in contact with each other while the bulges 114 and 116 are in contact with each other. Three separate box sections 117, 118 and 119 are thus made. The depth of the bulges 113 to 116 depends essentially on the technical characteristics that it is desired to obtain.

All the profiles shown in FIGS. 1 to 11 must not exceed a certain width L so that the hollow profiled tubes can be wound helically. This is because if the profile is too wide, during winding the forces will be too high and there would be a risk of them making the side walls of the profile buckle. The profile must therefore have a maximum width L which depends, on the one hand, on the thickness e of the tube and, on the other hand, on the height H of the profile. Tests carried out have shown that the results are satisfactory when:

0.5<L/H<5 and preferably 1<L/H<3L/e<20.

By producing a shaped wire from a hollow profiled tube, a more compact tube-fastener pair is obtained, thereby optimizing the moment of inertia/winding pitch ratio. As a consequence, the performance of the pressure vault produced in one of the embodiments described above is increased. The measurements carried out show that, for a profile 20 mm in height and 3 mm in thickness, the moment of inertia/effective pitch ratio is 260 mm$^3$ whereas the same ratio for a strip box-section profile, 20 mm in height and 3 mm in thickness, is 210 mm$^3$.

For a profile of the type shown in FIGS. 10 and 12, use is made of a metal tube 2.5 mm in thickness and with a perimeter of 120 mm, which is bent so as to obtain a profile 20.4 mm in height and 38 mm in width. The slopes of the side faces of the profile are 80° to the horizontal. With such dimensions, a moment of inertia/pitch ratio of 250 mm$^3$ is obtained.

As regards the moment of inertia/weight ratio, it was found that this was of about 1.6 with profiles of the present invention, which represents an increase of 20% compared with known lightened profiles and 60% compared with shaped wires. The present invention thus achieves two objectives, namely a reduced manufacturing cost and an increase in the moment of inertia/weight ratio for deep-sea use in which it is necessary to withstand high external pressures.

Depending on the application of the hollow profiled tubes described with reference to FIGS. 1 to 12, it is possible to place inside said tubes an electrical conductor which can be used for possibly heating the fluid flowing in the flexible pipe, by the skin effect or by the Joule effect, by the induction effect, etc.

It would also be possible to place rods or other tubes transporting a heat transfer fluid in the upper and lower bulges of the profiles illustrated in FIGS. 10 and 12.

In addition, the fastening may be effected from above the winding turns or from below, or else from above and from below, depending on the dynamic or static use of the flexible pipe. One advantage of interlocking from above and below is that it makes it possible to limit the creep of the internal and/or external plastic sheaths. It is also possible, when necessary, to fill the bulges with a filling material so as to limit the creep of said plastic sheaths.

At the bulges of the various profiles, it will be attempted to limit the creep by optimizing the height of the bulge.

The present invention also relates to a process for manufacturing the flexible pipe, in which at least one of the metal reinforcing layers, such as the pressure vault or the metal carcass, is formed by a helical winding about the longitudinal axis of said flexible pipe of at least one interlocked hollow profiled tube having one of the cross-sections shown in FIGS. 1 to 11. Preferably the cross-section of the hollow profiled tube is approximately trapezoidal.

It should also be noted that it is possible to produce a simultaneous winding of at least two profile tubes, oriented in opposite directions, so that the side walls of the adjacent turns are parallel. This would allow the moment of inertia/pitch ratio to be increased.

The invention claimed is:

1. A flexible tubular pipe, comprising at least one hollow profiled metal tube spiraled in a helix about a longitudinal axis of the flexible pipe, the metal tube being peripherally continuously closed without any gaps or welds, wherein the metal tube is interlocked but is otherwise free of any attachment, said profiled metal tube forming at least one spiraled box section.

2. The flexible tubular pipe as claimed in claim 1, comprising two separate box sections, defined in the a hollow profiled tube, and each box section being symmetrical with respect to a mid-axis of the profiled tube.

3. The flexible tubular pipe as claimed in claim 2, wherein the profiled tube includes an upper radially outer wall and a lower radially inner wall, the box sections being defined by the hollow profiled tube being deformed such that the upper walls and the lower walls of the deformed hollow profiled tube bear against one another in a contact region.

4. The flexible tubular pipe as claimed in claim 2, wherein each box section includes external side walls, which make an angle of between 60 and 90° with the horizontal.

5. The flexible tubular pipe as claimed in claim 3, said tube including a neutral fiber with no stress, wherein the contact region is located on the neutral fiber of the hollow profiled tube.

6. The flexible pipe as claimed in claim 1, including a pressure vault formed by a helical winding with a short pitch of the hollow profiled tube about the longitudinal axis of the flexible pipe.

7. The flexible pipe as claimed in claim 1, including an internal carcass formed by a helical winding with a short pitch of the hollow profiled tube about the longitudinal axis of the flexible pipe.

8. The flexible pipe as claimed in claim 1, wherein the hollow tube includes an upper radially outer wall and a lower radially inner wall; the hollow tube having a cross-section that comprises, on at least one of the upper and lower walls, at least one bulge directed toward the opposed one of the upper and lower walls, the bulge being shaped to act as a housing for a fastener intended for interlocking two consecutive turns of the helical winding.

9. The flexible pipe as claimed in claim 1, wherein the hollow profiled tube includes an upper radially outer wall and a lower radially inner wall, and windings of the hollow profiled tube are interlocked via their upper walls.

10. The flexible pipe as claimed in claim 1, wherein the hollow tube includes an upper radially outer wall and a lower radially inner wall, and windings of the hollow profiled tubes are interlocked via their lower walls.

11. A flexible tubular pipe comprising a metal box section spiraled in a helix abut a longitudinal axis of the flexible pipe, the box section comprised of at least one interlocked hollow profiled tube, said hollow profiled tube having an approximately trapezoidal cross-section.

12. A flexible tubular pipe comprising two separate box sections spiraled in a helix about a longitudinal axis of the flexible pipe, each said box section being comprised of at least one interlocked hollow profiled tube and being symmetrical with respect to a mid-axis of the profiled tube, said hollow profiled tube having an approximately trapezoidal cross-section.

13. A flexible tubular pipe comprising a metal box section spiraled in a helix about a longitudinal axis of the flexible pipe, the box section comprised of at least one interlocked hollow profiled tube, wherein the hollow tube includes an upper radially outer wall and a lower radially inner wall, and windings of the hollow profiled tubes are interlocked via their upper and lower walls.

14. The flexible tubular pipe as claimed in claim 1, wherein the profile of the at least one interlocked hollow profiled tube has a maximum width (L) and a height (H) and the tube has a thickness (e) such that 0.5<L/H<5 and L/e <20.

15. The flexible tubular pipe as claimed in claim 14, wherein 1<L/H<3.

* * * * *